United States Patent [19]

Kawaguchi

[11] 4,343,380

[45] Aug. 10, 1982

[54] DISK BRAKE ASSEMBLY

[75] Inventor: Takeshi Kawaguchi, Fujimi, Japan

[73] Assignee: Honda Giken Kogyo Kabushiki Kaisha, Tokyo, Japan

[21] Appl. No.: 143,789

[22] Filed: Apr. 25, 1980

[30] Foreign Application Priority Data

May 29, 1979 [JP] Japan .................................. 54-65529

[51] Int. Cl.³ .............................................. B60T 1/06
[52] U.S. Cl. .................................. 188/18 A; 188/71.1; 188/73.43; 188/344
[58] Field of Search ............... 188/18 A, 344, 71.1, 188/264 B, 73.43; 301/6 E, 6 V

[56] References Cited

U.S. PATENT DOCUMENTS

| | | | |
|---|---|---|---|
| 2,359,516 | 10/1944 | Frank | 188/18 A X |
| 2,707,604 | 5/1955 | Dowty | 188/18 A X |
| 2,862,578 | 12/1958 | Waber | 188/18 A |
| 3,602,339 | 8/1971 | Sontheimer | 188/18 A |
| 3,899,049 | 8/1975 | Martin | 188/18 A |
| 3,940,159 | 2/1976 | Pringle | 188/18 A X |
| 3,982,610 | 9/1976 | Campagnolo | 188/18 A |
| 4,171,035 | 10/1979 | Takoaki | 188/73.3 |

FOREIGN PATENT DOCUMENTS 1036230 7/1966 United Kingdom ............ 188/18 A

Primary Examiner—George E. A. Halvosa
Attorney, Agent, or Firm—Lyon & Lyon

[57] ABSTRACT

A brake disk is fixed to a wheel hub to rotate therewith, and axially spaced bearings support the wheel hub on an axle. A non-rotary caliper member extends through a central opening in the brake disk and carries pads which engage opposite surfaces of the brake disk when hydraulic pistons are energized. A portion of the caliper member encircles a portion of the wheel hub, and a wide supporting surface is provided to minimize tilt or cant of the caliper member. In a preferred embodiment a support rim encircles the portion of the wheel hub to provide wide spacing of supports for the caliper member. Another embodiment places the central plane of the brake disk in the center of one of the wheel hub bearings and in the central portion of the cylindrical rim. Limited axial movement of the caliper member after wear of the brake disk and friction pads is accommodated by resilient bushings at both ends of a torque arm which prevents rotary movement of the caliper member.

7 Claims, 7 Drawing Figures

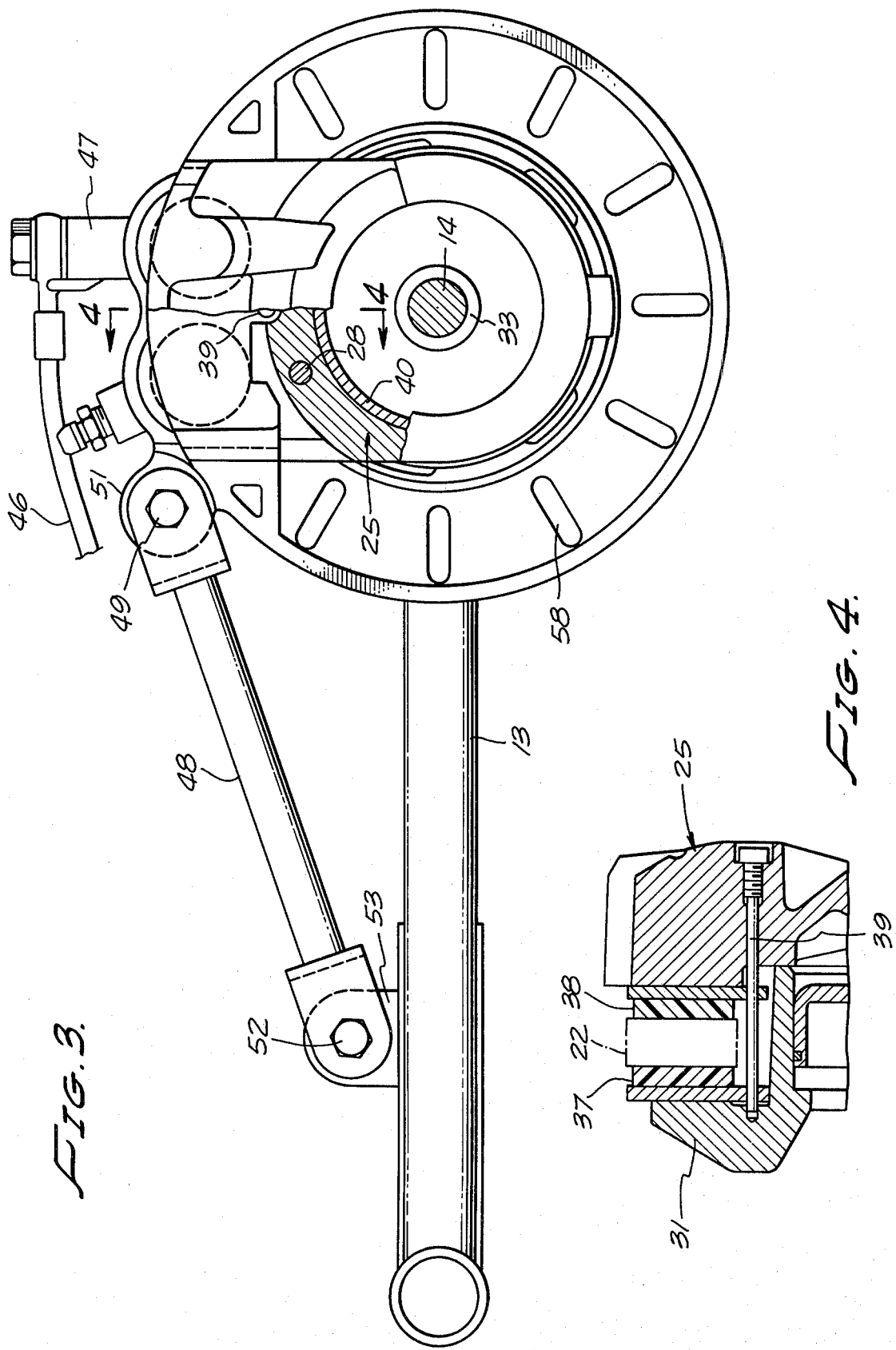

DISK BRAKE ASSEMBLY

This invention relates to disk brake assemblies of the type used on two wheeled vehicles, such as motorcycles. An axle of the motorcycle may support the rotary wheel hub as well as the non-rotary caliper member, and it is highly desirable to have wide spacing for the bearings for the wheel hub as well as wide spacing for the supports for the caliper member, the latter requiring limited axial movement caused by wear of the friction parts. The brake disk is supported on its outer periphery by the wheel hub and the caliper member is provided with hydraulically operated means for clamping the brake disk between friction pads.

It is an object of this invention to provide a construction in which both the wheel hub and the caliper member overlap axially in order to maximize the axial spacing of the wheel hub bearings and the caliper member supports. In the preferred embodiment of this invention this feature is achieved by the use of a cylindrical rim which encircles a portion of the wheel hub and contacts a cylindrical bore in the caliper member. A second axially spaced support for the caliper member is provided on a sleeve mounted on the wheel axle.

Another object of this invention is to provide a torque arm for preventing rotary motion of the caliper member, which torque arm is equipped at both ends with resilient bushings to allow limited axial movement of the caliper member after a period of use of the disk brake assembly, and without causing canting or tilting of the caliper member which would interfere with its free sliding movement.

The force of the driving sprocket attached to the wheel hub is off-center with respect to the bearings supporting the wheel hub, and therefore wide spacing of the bearings is needed to prevent tilt or cant of the wheel hub. Similarly, the torque arm for resisting turning movement of the caliper member is off-center with respect to the slidable supports for the caliper member. Telescoping of one of the slidable supports with respect to the adjacent wheel hub bearing maximizes the spacing for the wheel hub bearings and also for the sliding supports for the caliper member.

Other and more detailed objects and advantages of this invention will appear hereinafter.

In the drawings:

FIG. 3 is a side elevation partly in section.

FIG. 4 is a sectional detail taken substantially on the lines 4—4 as shown in FIG. 3.

Figure 5:
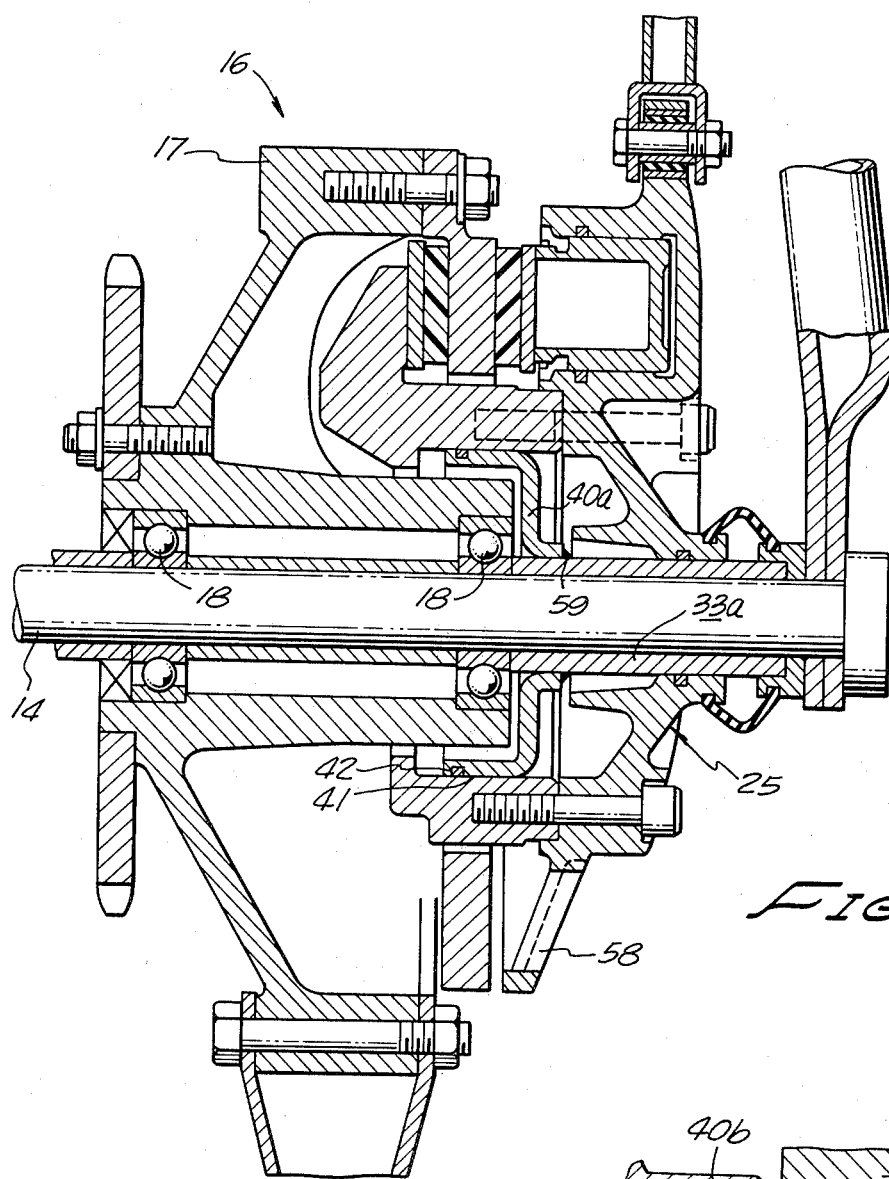
Figure 6:
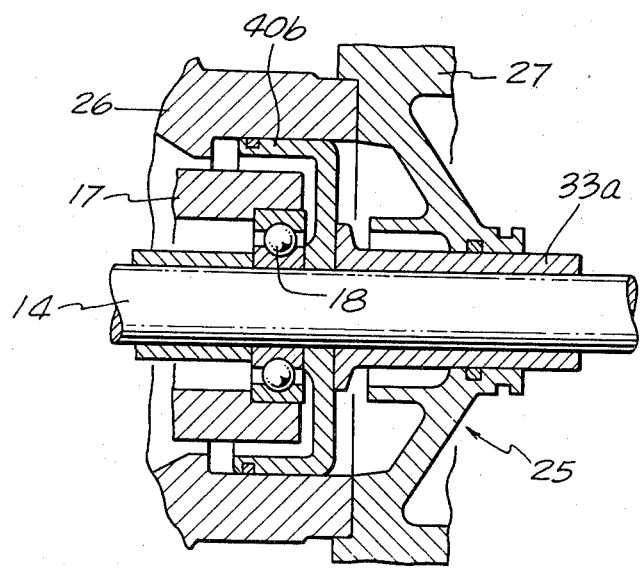
Figure 7:
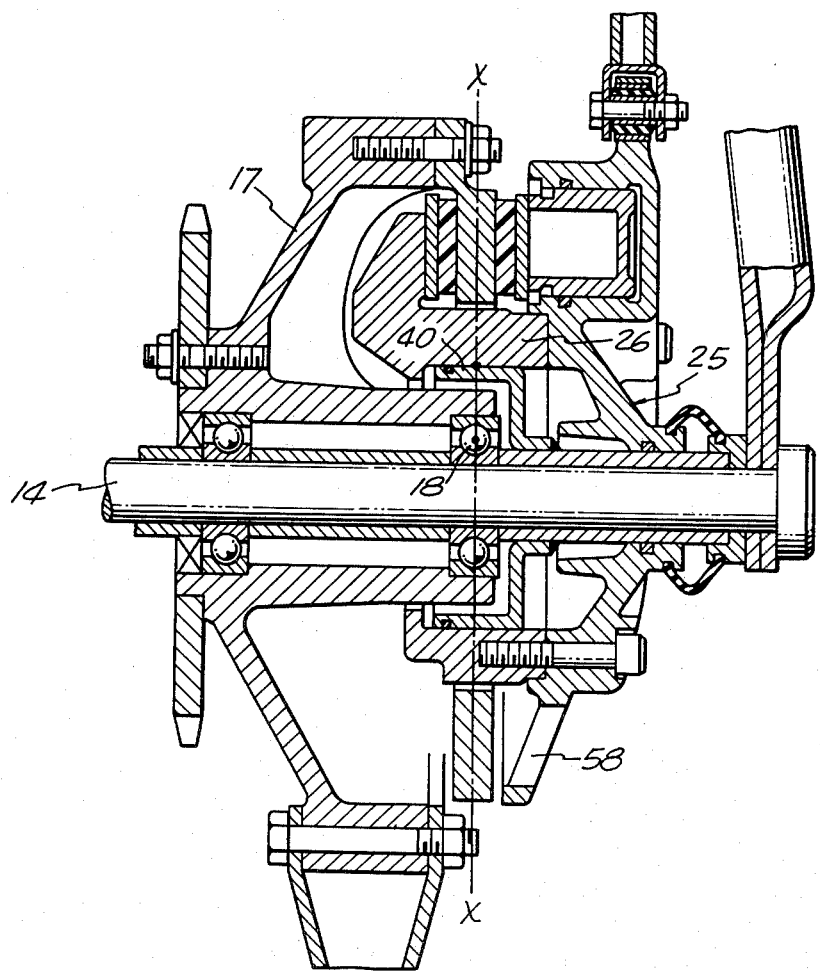

FIGS. 5, 6, and 7 are sectional side elevations showing modifications.

Referring to the drawings, the motorcycle generally designated 10 has a rear wheel 11 mounted on a frame 12 by means of a rear fork assembly 13, a rear axle 14 and the cushion members 15. The rear axle 14 is fixed to the rear fork assembly 13.

A disk brake assembly generally designated 16 is operatively positioned between the rotary wheel hub member 17 and the non-rotary rear fork assembly 13. The wheel hub member 17 is mounted on axially spaced bearings 18 carried on the rear axle 14. The wheel part 19 is mounted on the wheel hub 17 by means of the bolts 21. In the preferred form of the invention as shown in FIGS. 1-4, an annular brake disk 22 has a series of lugs 23 formed on its outer periphery and these are secured to the wheel hub 17 by means of studs 24 so that the wheel hub 17 and the brake disk 22 rotate as a unit.

A caliper member generally designated 25 is of split construction with its two parts 26 and 27 secured together by threaded fastenings 28. The caliper part 26 has a cylindrical portion which encircles an axially extending portion 29 of the wheel hub 17 and is provided with a plurality of circumferentially spaced thrust-receiving elements 31. This part 26 extends through the central opening 32 in the brake disk 22.

The other part 27 of the caliper member 25 has a cylindrical bore 41 mounted to slide on the stationary support sleeve 33 carried on the rear axle 14. This part 27 is provided with a plurality of bosses 34 positioned opposite the thrust-receiving elements 31. Each boss 34 has a cylindrical bore 35 extending parallel to the rear axle 14. Each bore 35 slidably supports a hollow piston 36. Interposed between each piston 36 and thrust-receiving element 31 are the brake pads 37 and 38 which contact opposite faces of the brake disk 22. As shown in FIG. 4, the brake pads 37 and 38 are held against turning movement relative to the caliper member 25 by means of axially extending pins 39.

A cylindrical rim 40 constituting a part of the support sleeve 33 slidably supports the cylindrical bore 41 provided in the part 26 of the caliper member 25. The seal ring 42 prevents escape of lubricant from the chamber 63. A flexible boot 44 prevents escape of lubricant along the bore 45 and also acts to exclude foreign matter from the lubricant chamber 43.

Figure 1:
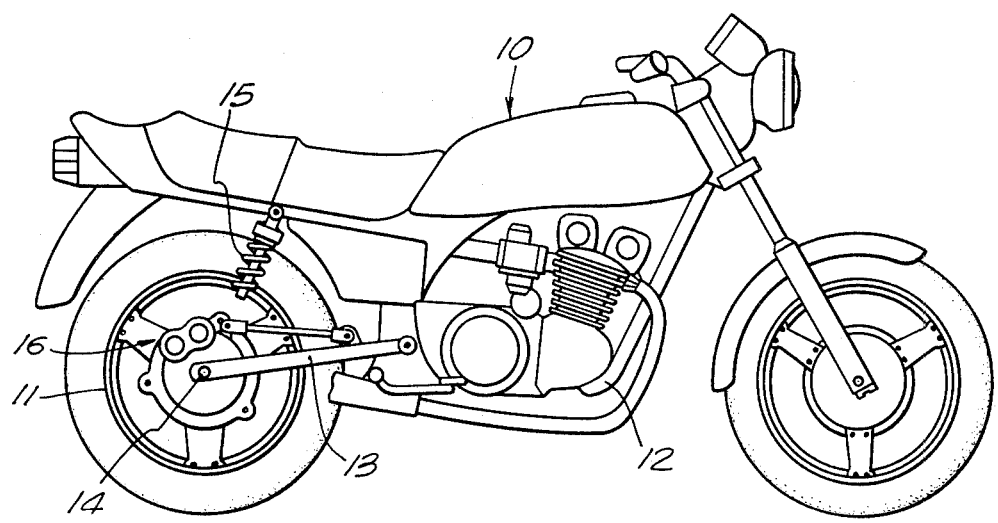
FIG. 1 is a side elevation of a motorcycle equipped with a disk brake assembly constituting a preferred embodiment of this invention.
Figure 2:
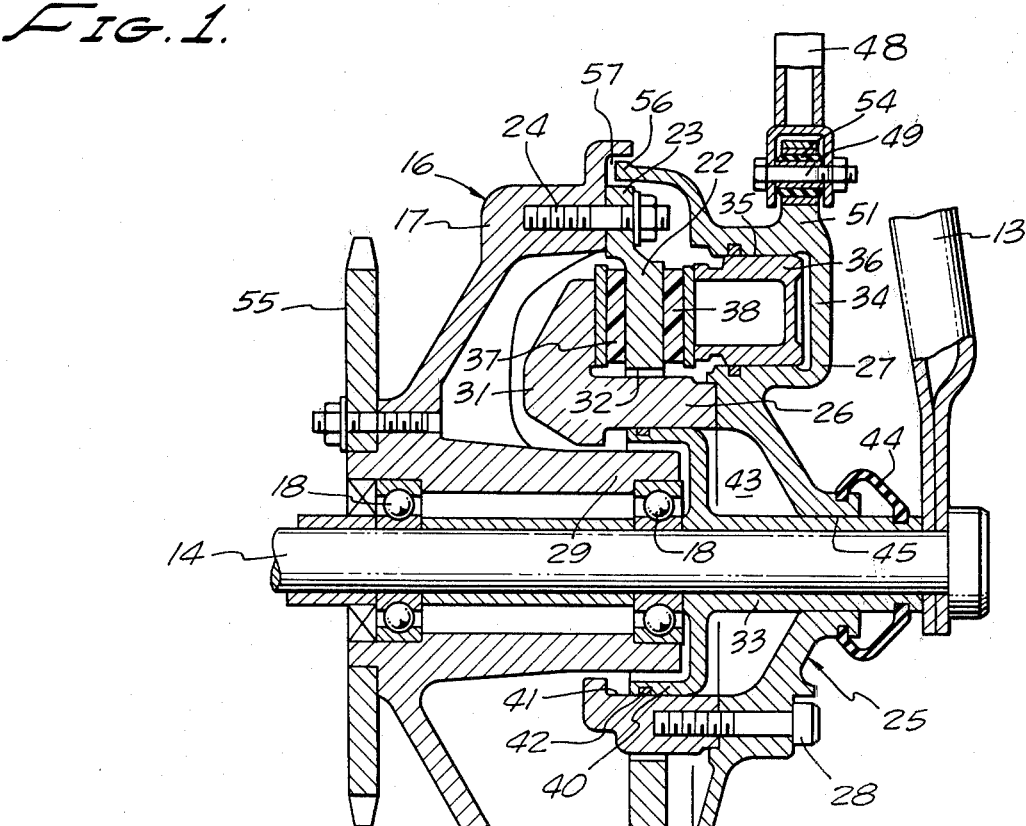
FIG. 2 is a sectional plan view of the disk brake assembly shown in FIG. 1.

Means are provided for supplying hydraulic fluid under pressure to move the pistons 35 toward the thrust-receiving elements 31, to cause frictional engagement between the brake disk 22 and the brake pads 37 and 38. As shown in FIG. 2 of the drawings, this hydraulic means includes a flexible hose 46 and a fitting 47.

The caliper member 25 is prevented from turning with the wheel hub 17 by means of a torque arm 48. This torque arm 48 is pivotally connected at 49 to the lug 51 fixed on the outer periphery of the caliper part 27, and is pivotally connected at 52 to a lug 53 fixed on the rear fork assembly 13. Each of these pivotal connections 49 and 52 includes a resilient bushing 54 which permits a limited amount of sidewise movement of the caliper member 25 to accommodate wear which develops between the brake disk 22 and the brake pads 37 and 38 after a period of service. These pivotal connections minimize imposition of sidewise forces on the caliper member 25 by the torque arm 48.

The part 27 of the caliper member 25 is provided on its outer periphery with a laterally extending lip 56 which projects into a groove 57 provided on the outer periphery of the wheel hub 17. This serves to provide a measure of protection against entry of water or other foreign matter into the region occupied by the brake disk 22 and the brake pads 37 and 38.

From the foregoing description it will be understood that the support member 33 and its cylindrical rim 40 provide an important function in supporting the caliper member 25 at widely spaced locations, thereby minimizing canting or twisting of the caliper member. This beneficial effect is achieved without shortening the axial spacing between the bearings 18 or the wheel hub 17. The portion 29 of the wheel hub member 17 telescopes within the cylindrical rim of the guide member 33. This too is an important feature because the force supplied by the driving sprocket 55 tends to cant the wheel hub member 17 with respect to the rear axle 14.

As shown in FIG. 3, the caliper member 25 may be provided with a plurality of radial slots 58 which serve as air holes for heat dissipation.

The modified form of the invention shown in FIG. 5 is the same as that previously described except that the cylindrical sleeve 33a and the rim member 40a are formed of two parts welded together at 59.

In the modified form of the invention shown in FIG. 6, the parts are the same as those previously described except that the cylindrical rim member 40b is supported on the axle 14 and is clamped between the support sleeve 33a and the inner race of the bearing 18.

In the modification shown in FIG. 7, the central plane "X—X" also is substantially the same as the central plane of the bearing 18 and the central portion of the cylindrical rim which slidably supports the part 26 of the caliper member 25. The effect is to minimize canting or twisting movement of the caliper member 25, with consequent reduction in axial slidability thereof. In other aspects the device of FIG. 7 is similar to the device of FIG. 2.

Having fully described my invention, it is to be understood that I am not to be limited to the details herein set forth but that my invention is of the full scope of the appended claims.

I claim:

1. In a disk brake assembly, the combination of: a stationary axle, a wheel hub, axially spaced bearings supporting said wheel hub on said axle, a support member having a stationary cylindrical sleeve mounted directly on said axle, a brake disk having opposite parallel faces and having a central opening, means at the outer periphery of the brake disk for securing it to said wheel hub, a caliper member carrying brake pads for contacting opposite faces of said brake disk, said caliper member having a first part supported through said cylindrical sleeve on said axle at a position axially spaced from said wheel hub and a second part extending through said central opening of said disk, said second part formed with a cylindrical bore which encircles a portion of the wheel hub, a cylindrical rim of said stationary cylindrical sleeve slidably supporting said cylindrical bore of said second part spaced radially about said wheel hub, means on said caliper member for clamping said brake disk between said disk pads, and means for preventing rotation of said caliper member.

2. The combination set forth in claim 1 in which a lip on the caliper member cooperates with a peripheral groove on the wheel hub to exclude foreign matter from the brake disk and disk pads.

3. The combination set forth in claim 1 in which the latter said means comprises a torque arm having a pivotal connection at one end with said caliper member and a pivotal connection at the other end with a stationary member, both of said pivotal connections employing a resilient bushing to permit movement of said caliper member axially of said axle.

4. The combination set forth in claim 1 in which a lubricant chamber is formed outside said support member and between the sliding contact portions of said caliper member.

5. The combination set forth in claim 1 in which the latter said means comprises a torque arm having a pivotal connection at one end with said caliper member and a pivotal connection at the other end to a stationary member, both of said pivotal connections employing a resilient bushing to permit axial movement of said caliper member.

6. The combination set forth in claim 1 in which axially spaced bearings support the wheel hub on the axle, said cylindrical rim encircling a portion of the wheel hub and one of said bearings and having a support portion fixed to said sleeve.

7. The combination set forth in claim 1 in which, said brake disk has a central transverse plane which passes substantially through the center of one of said bearings.

* * * * *